United States Patent [19]

Campbell

[11] Patent Number: 5,421,380
[45] Date of Patent: Jun. 6, 1995

[54] GAS TANK EVACUATOR

[76] Inventor: Michael C. Campbell, 1400 N. Woodhouse Rd., Virginia Beach, Va. 23454

[21] Appl. No.: 213,499

[22] Filed: Mar. 16, 1994

[51] Int. Cl.⁶ .................................. B65B 31/04
[52] U.S. Cl. ........................ 141/65; 141/385; 141/286; 137/327; 29/221.6; 29/801
[58] Field of Search .................. 141/51, 65, 97, 98, 141/38, 384, 385, 286, 3, 4; 29/213.1, 221.6, 801, 426.1, 403.1, 403.3; 137/327; 251/63.5, 63.4

[56] References Cited

U.S. PATENT DOCUMENTS

| | | | |
|---|---|---|---|
| 1,242,873 | 10/1917 | Schröder | 251/63.5 |
| 3,333,735 | 8/1967 | Odasso | 222/5 |
| 3,430,819 | 3/1969 | Moonan | 141/3 |
| 3,840,967 | 10/1974 | Olson | 29/221.6 |
| 4,071,012 | 1/1978 | Cooke | 137/321 |
| 4,407,341 | 10/1983 | Feldt et al. | 141/97 |
| 4,699,190 | 10/1987 | Bates | 141/65 |
| 4,705,082 | 11/1987 | Fanshawe et al. | 141/4 |
| 5,188,155 | 2/1993 | Kremer | 141/65 |
| 5,271,437 | 12/1993 | O'Brien et al. | 141/51 |
| 5,303,749 | 4/1994 | Stock et al. | 141/51 |

Primary Examiner—Henry J. Recla
Assistant Examiner—Steven O. Douglas
Attorney, Agent, or Firm—Griffin, Butler Whisenhunt & Kurtossy

[57] ABSTRACT

A gas tank evacuator (10) comprises an evacuator housing (12) into which a neck (80) of a gas tank (82) can be screwed and an elongated valve-removal rod (14) for slidably passing through the evacuator housing and engaging and unscrewing a stem-actuated valve (88) of the gas tank. An elongated valve actuator pin (18) slidably passes through the valve-removal rod to extend from lower and upper ends of the valve-removal rod for independently actuating the stem-actuated valve. The valve-removal rod is moved longitudinally by a valve-removal-rod lever (16) which is pivotally attached to the evacuator housing and valve-removal rod by pivot links (60). The valve-removal-rod lever is pivoted on the evacuator housing to drive a valve-engaging device at a lower end of the valve-removal rod into engagement with the stem-actuated valve of the gas tank for its removal from the gas tank.

19 Claims, 6 Drawing Sheets

GAS TANK EVACUATOR

BACKGROUND OF THE INVENTION

This invention relates generally to the art of gas cylinders, or tanks, and more specifically to methods and devices for disposing of, or recycling, gas cylinders.

Disposal of hazardous waste is currently regulated in the U.S. by the Resource Conservation And Recovery Act (RCRA) of 1976. Many other developed countries have similar legislation. These laws attempt to control hazardous waste from "Cradle to Grave." One of the items classified as "hazardous-waste" under the RCRA is "contained gas." Thus, gas tanks, or cylinders, which have been used to store, propane, mapp, or oxygen gases, for example, are classified as hazardous waste and they retain this classification until it can be clearly shown that they no longer contain hazardous waste. For this reason, waste handlers charge large fees for disposing of substantially exhausted small propane tanks, for example. In this regard, many companies which regularly use propane gas pay as much as $35.00 per exhausted tank simply to dispose of them. It should be noted that although old gas tanks cannot normally be reused, the material from which they are made, often steel, can be recycled. Notwithstanding this, because they still may contain hazardous waste, waste handlers charge large fees for their disposal.

If users of propane tanks, and waste handlers, could readily, and visually, ascertain that exhausted tanks no longer contain gas, and that it is not possible that they could hold gas, the tanks could be easily and economically disposed of and recycled as scrap steel.

Thus, it is an object of this invention to provide a gas tank evacuator for not only safely evaluating contents of gas tanks, that is for draining residue gases from them, but also for preparing the gas tanks so that it can be clearly and visibly ascertained that they cannot possibly contain hazardous gases.

It is also an object of this invention to provide such a gas tank evacuator which can be employed by users of gas tanks, such as companies which employ large numbers of propane tanks, rather than only by waste handlers.

It is also an object of this invention to provide a gas tank evacuator which is highly portable, but which can be used either as a table-mounted unit or as a hand-held unit.

Yet another object of this invention is to provide a gas tank evacuator which takes very little strength or dexterity to operate and which is uncomplicated and relatively inexpensive in structure.

Finally, it is an object of this invention to provide a method of preparing gas tanks for their disposal which is inexpensive but yet effectively communicates to others a disarmed nature of such thusly prepared gas tanks.

SUMMARY

According to principles of this invention, a gas tank evacuator has an evacuator housing into which an attachment neck of a gas tank can be screwed and an elongated valve-removal rod for passing through the evacuator housing to engage a valve of the gas tank at a valve-engaging lower end thereof. The valve-removal rod can be moved longitudinally in the evacuator housing by means of a valve-removal-rod lever which is pivotally attached to the housing and to the valve-removal rod by parallel pivot links. However, a connection between the valve-removal-rod lever and the valve-removal rod also allows the valve-removal rod to rotate in the housing. The gas tank evacuator also includes an elongated valve actuator pin passing through and being slidable in the valve-removal rod for independently actuating the valve of the gas tank.

Thus, the attachment neck of a gas tank can be screwed to the housing with the valve-removal rod pull longitudinally away from a valve in the attachment neck. The valve-actuator pin can then be moved longitudinally through the valve-removal rod for depressing a stem of the valve of the gas tank to release gas from the gas tank and check gas pressure in the gas tank. Thereafter, the valve-removal-rod lever can be pivoted to drive a valve engaging device at the lower end of the valve-removal rod into engagement with the stem-actuated valve. The valve-removal rod can then be rotated to unscrew the valve from the gas tank, and the valve-removal-rod lever can be pivoted upwardly for removing the valve.

The gas tank evacuator channels gases evacuated from gas tanks through a filter canister which is removably attached to the evacuator housing.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 7 is a side, partially cutaway, view of a gas tank with a marker of a type used in this invention mounted therein;

FIG. 8 is a side, partially cutaway, view of an embellished valve-removal rod and valve actuator pin; and FIG. 9 is a side view of an embellished expandable spring and label.

DESCRIPTION OF THE PREFERRED EMBODIMENT

Figure 1:
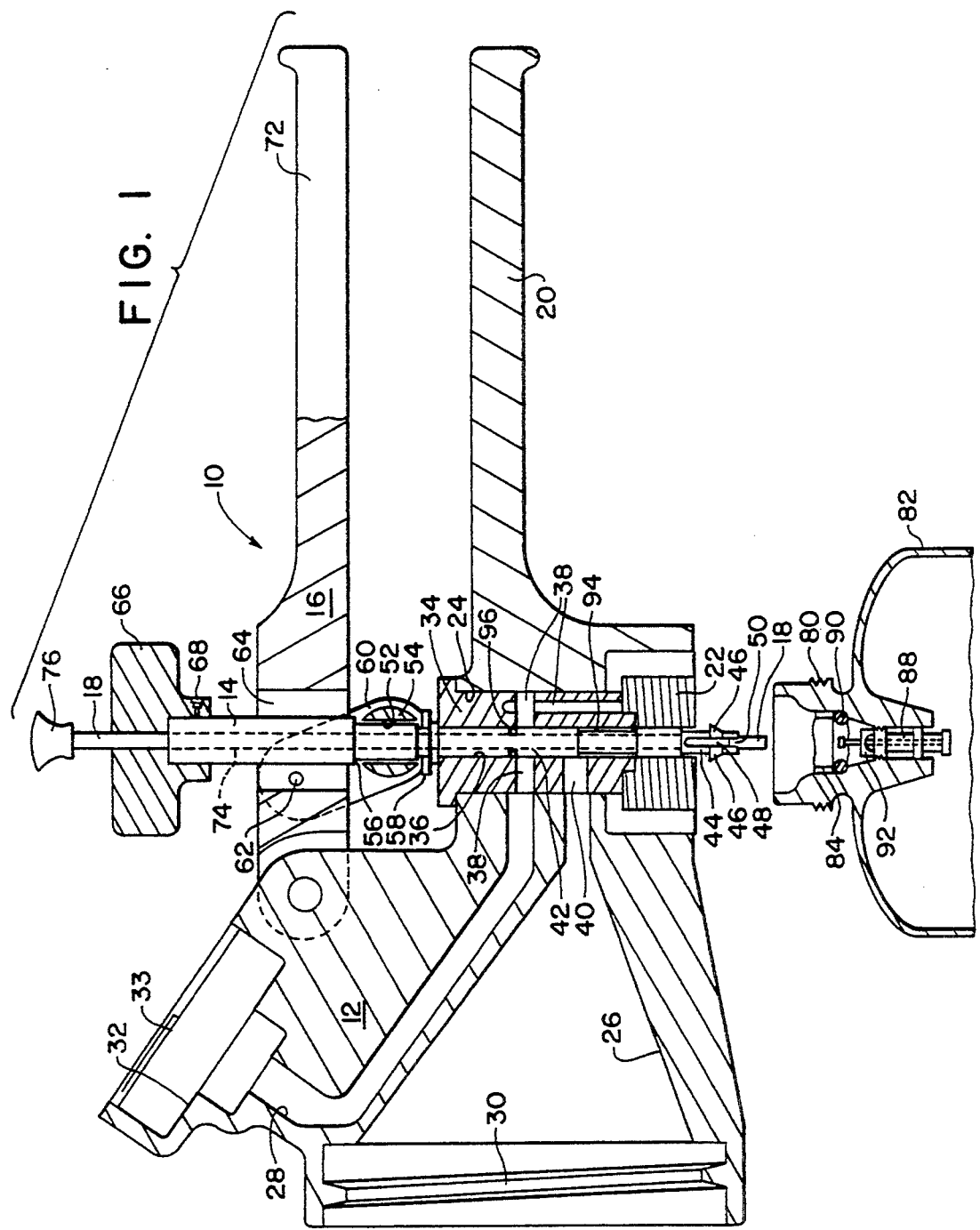
FIG. 1 is a side, partially cutaway, exploded, view of a gas tank evacuator of this invention and a segment of a gas tank.

A gas tank evacuator 10 comprises mainly an evacuator housing 12, a cylindrical valve-removal rod 14, a valve-removal-rod lever 16, and a valve-actuator pin 18.

Figure 3:
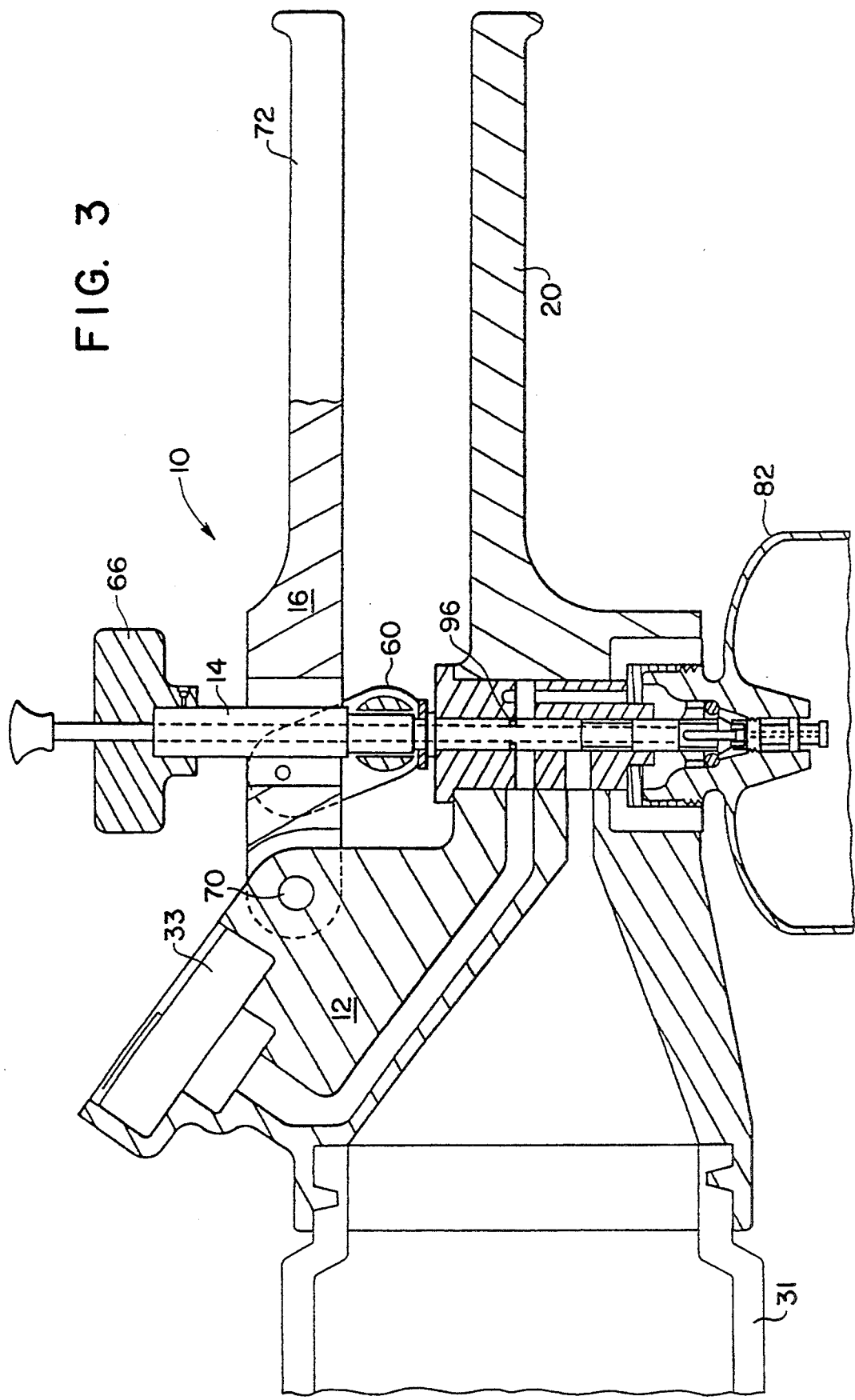
FIG. 3 is a view similar to that of FIG. 2, but with the valve-removal-rod lever being pivoted downwardly for driving an engaging device at a lower end of a valve-removal rod into removal engagement with valve elements of the gas tank and with a charcoal canister being attached to the evacuator housing.

The evacuator housing 12 has a housing handle 20 which is long and narrow in the manner of a cooking pot handle. The housing handle 20 is integral with other main portions of the evacuator housing 12. The evacuator housing 12 defines a female-threaded, tank-attachment, cavity 22, a bushing bore 24 passing through the evacuator housing 12 at the tank-attachment cavity 22, a gas filter passage 26 communicating with the bushing bore 24, and a pressure gauge passage 28, also communicating with the bushing bore 24. The gas filter passage 26 includes female threads 30 thereon for receiving a male threaded neck of an off-the-shelf, activated-carbon cartridge 31 (shown only in FIG. 3) of a type employed for evacuating aerosol cans into 55-gal. drums (see U.S. Pat. No. 5,265,762 for further explanation regarding use of such an activated-carbon cartridge). The pressure gauge passage 28 defines a pressure gauge cavity 32 in which a pressure gauge 33 is mounted for measuring a pressure of gas in the pressure gauge passage 28.

A brass, cylindrical, bushing 34 is mounted in the bushing bore 24 to extend from an upper end of the bushing bore 24 to the tank-attachment cavity 22. The bushing 34 has a central bore 36 and test cavities 38 which extend from the tank-attachment cavity 22 to the pressure-gauge passage 28 via the central bore 36. The bushing 34 has similar evacuation passages 40 for communicating the tank-attachment cavity 22 with the gas filter passage 26 via the central bore 36 (all of the evacuation passages 40 cannot be seen in the drawings inasmuch as a vertical passage is covered by the valve-removal rod 14.

The valve-removal rod 14 has a slidable portion 42 with a maximum outer diameter which is only slightly smaller than the inner diameter of the central bore 36 so that it can relatively snugly slide in the central bore 36. The valve-removal rod 14 also has a valve-engaging device at its lower end portion 44, as viewed in FIGS. 1–4. In this regard, the lower end portion 44 has a diameter which is mainly reduced in size from the diameter of the slidable portion 42 but which includes upwardly engaging barbs 46 on opposite sides thereof. The barbs do not extend completely about the lower end portion 44 since they are separated by two opposite longitudinal grooves 48 (only one shown). The lower tip of the lower end portion 44 has an axially-extending, downwardly-directed, groove 50 thereat, which is also part of the valve-engaging device.

The valve-removal rod 14 is rotably mounted in a bore 52 passing radially through a cylinder bushing 54 so that the valve-removal rod 14 can rotate in this bore 52. However, the valve-removal rod 14 is prevented from moving longitudinally in the bore 52 of the cylinder 54 by a shoulder 56 machined in the valve-removal rod 14 and a locking disc 58 which is mounted in a groove machined in the valve-removal rod 14. The cylinder bushing 54 is attached at its opposite ends to pivot links 60 (only one shown in the drawings). Opposite ends of the pivot links 60 are pivotally attached at 62 to the valve-removal-rod lever 16 and a center axis of the cylindrical bushing 54. An upper end portion of the valve-removal rod 14 passes through a cavity 64 in the valve-removal-rod lever 16 and has to a knob 66 affixed thereto by a set screw 68.

The valve-removal-rod lever 16 is pivotally attached to the evacuator housing 12 at 70 and has a lever handle 72 which is similar to a handle of a cooking pot and which can be rotated to be approximately parallel to the housing handle 20.

The valve-actuator pin 18 is a solid cylindrical shaft having a uniform outer diameter which is slidably mounted in a bore 74 passing through the center longitudinal axis of the valve-removal rod 14. A knob 76 affixed to an upper end of the valve-actuator pin 18 allows an operator to independently slide the valve-actuator pin 18 up and down relative to the valve-removal rod 14 as viewed in FIGS. 1–4.

In operation, the gas tank evacuator 10 can be mounted on a table at mounts 78 (see FIGS. 4 and 5) or it can simply held in a user's hand gripping the handle 20. An attachment neck 80 of a gas tank 82, which has male threads thereon, is moved into the tank-attachment cavity 22, as shown in FIG. 1, and its male threads are engaged with the female threads of the tank-attachment cavity 22 by rotating the gas tank 82 or the gas tank evacuator 10. As the gas tank 82 is moved into the tank-attachment cavity a plastic grommet 84 mounted in the attachment neck 80 by friction, as part of a seal for sealingly coupling the gas tank 82 to gas receivers, engages lower inclined surfaces of the barbs 46 on the valve-removal rod 14 and thereby causes the valve-removal rod 14 to move upwardly. Simultaneously, the valve-removal-rod lever 16 pivots upwardly at the pivot attachment 70 until it is in the position depicted in FIG. 2. In this configuration, once the attachment neck 80 of the gas tank 82 is fully screwed into the tank-attachment cavity 22, the valve-actuation pin 18 can be independently pushed downwardly by an operator against a valve stem 86 of a valve 88 which is screwed into the attachment neck 80 of the gas tank 82 to thereby actuate the valve 88 and allow gas in the gas tank 82 to pass through the test passages 38 to the pressure gauge 33, thereby providing the operator with an indication as to gas pressure in the gas tank 82. It should be noticed that at this stage, the valve-engaging device at the lower end of the valve-removal rod 14 (i.e. the barbs 46 and the downwardly-directed groove 50) have not yet been brought into a full removal engagement with the valve 88, the grommet 84 and an O-ring 90 for removing these valve elements from the gas tank 82 (for purposes of the description herein the plastic grommet 84 and the O-ring 90 are treated as a part of a valve assemble). At this point, the operator can decide not to fully evacuate and dispose of the gas tank 82 if it shows enough pressure to warrant its retention.

Figure 2:
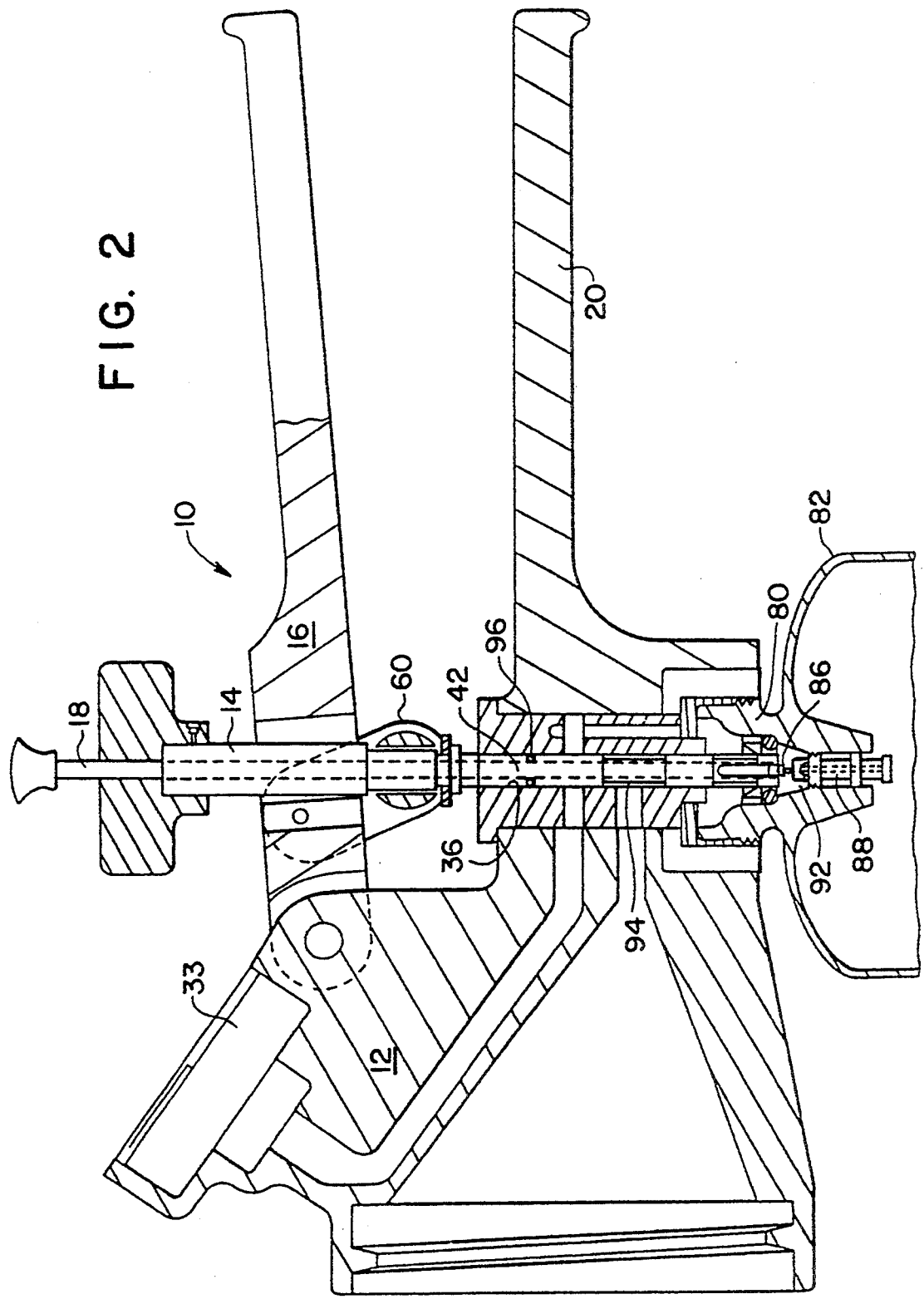
FIG. 2 is a view similar to FIG. 1, but in this view the gas tank is not exploded, or separated, from the evacuator housing, rather it is screwed thereinto and a valve-removal-rod lever of the gas tank evacuator is in a raised position.
Figure 4:
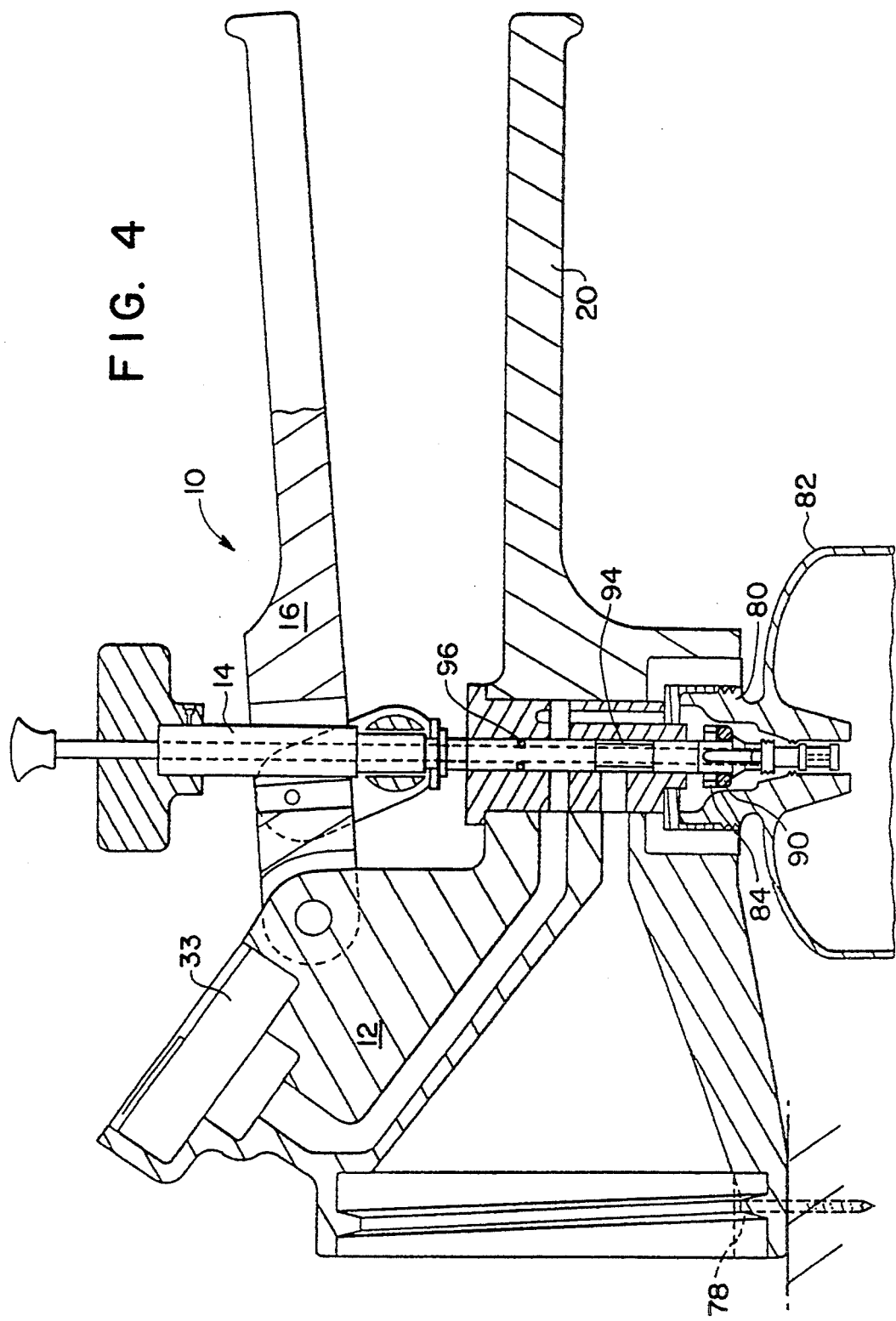
FIG. 4 is a view similar to that of FIG. 3, but with the valve-removal-rod lever being pivoted upwardly to pull valve elements from the gas tank by the engaging device at the lower end of the valve-removal rod.
Figure 5:
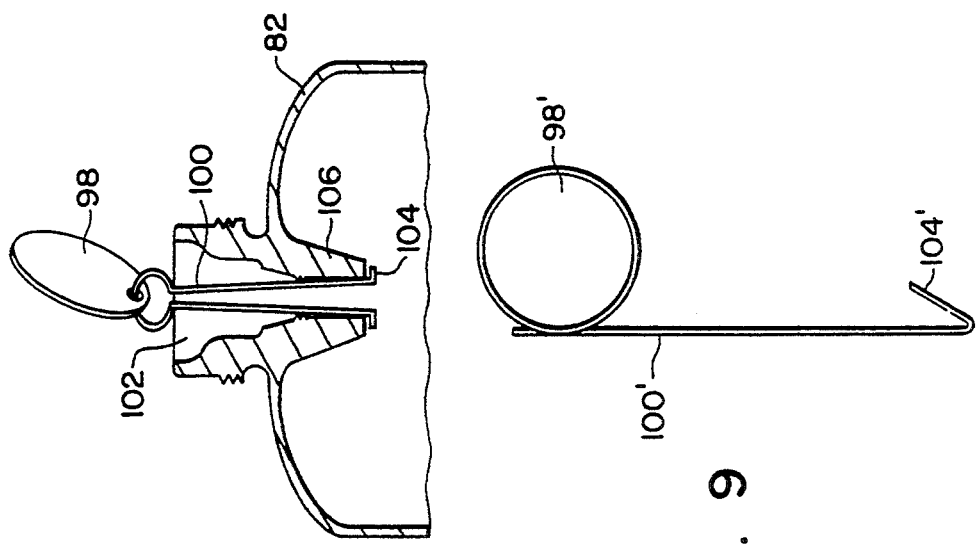
FIG. 5 is an end view of the gas tank evacuator of FIGS. 1-4.
Figure 6:
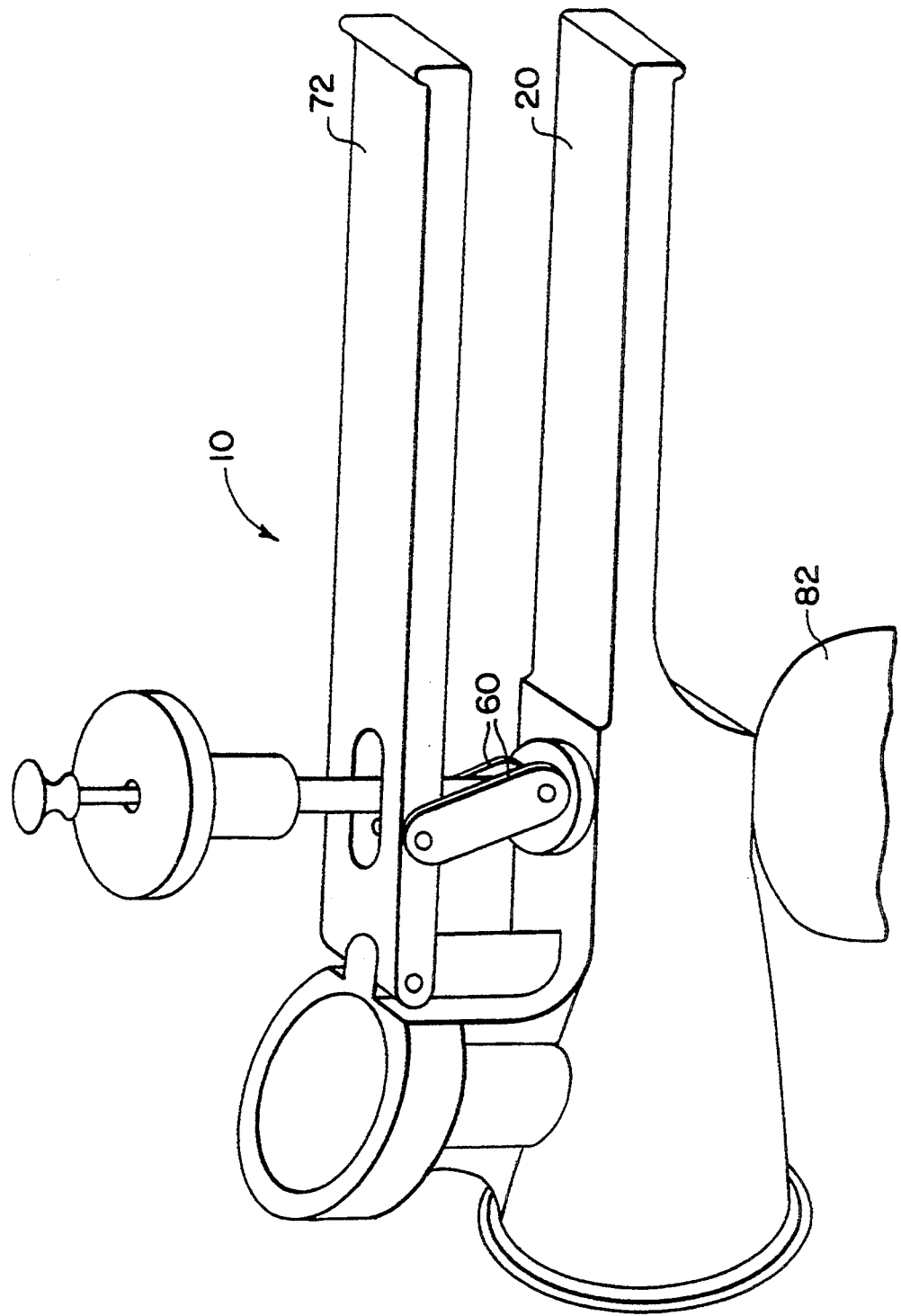
FIG. 6 is an isometric view of the gas tank evacuator of FIGS. 1-5.

If, however, the operator decides to dispose of the tank 82, he manually presses the lever handle 72 toward the housing handle 20 to thereby drive the valve-removal rod 14 downwardly relative to the evacuator housing 12 and into the gas tank 82 so that the valve-engaging device at the lower end of the valve-removal rod 14 is forced into removing engagement with the valve 88, the grommet 84 and the O-ring 90. That is, the barbs 46 are forced through the plastic grommet 84 and the rubber O-ring 90 so that flat radial surfaces of the barbs 46 are positioned below the O-ring 90 and the downwardly-directed groove 50 now engages a vertical, flat, portion 92 (for clarity, the portion 92 is depicted in FIG. 2 rotated 90° from its position in FIG. 1) of the valve 88. In this regard, the longitudinal grooves 48 between the barbs 46 allow the plastic grommet 84 and the O-ring 90 to become oblong when the barbs 46 pass therethrough so that they can pass through more easily. Once the valve-removal rod 14 has achieved the position depicted in FIG. 3, the knob 66 of the valve-removal rod 14 is rotated to thereby rotate the valve 88 and thereby screw the valve 88 from the attachment neck 80. Once the valve 88 is screwed from the attachment neck 80, the lever handle 72 is pivoted upwardly relative to the housing handle 20 to thereby cause the valve-removal rod 14 to move upwardly, carrying with it the grommet 84 and the O-ring 90, as is depicted in FIG. 4. Finally, the gas tank 82 is screwed from the tank-attachment cavity 22 and turned upside down to drop the stem-actuated valve 88 from the gas tank 82.

When the valve 88 is screwed from the attachment neck 80, any gas remaining in the gas tank 82 rushes from the attachment neck 80 and freely passes through the gas filter passage 26 and a gas filter cartridge attached thereto. An evacuation gap 94 in the slidable portion 42 of the valve-removal rod 14 is, in this position of the valve-removal-rod lever 16, positioned at the gas filter passage 26 to enhance flow of gas through the gas filter passage 26. In this regard, the slidable portion 42 of the valve-removal rod 14 is generally not tight enough in the central bore 36 to be sealed therewith, except at an O-ring 96 positioned above both the pressure gauge passage 28 and the gas filter passage 26 to prevent gases from escaping to outside atmosphere without passing through a filter.

It will appreciated by those of ordinary skill in the art that once the grommet 84 and the O-ring 90 as well as the valve 88 have been removed from the gas tank 82, it can be easily, visually, ascertained that the gas tank 82 can no longer house a hazardous waste; thus, this gas tank can be recycled and disposed of in the same manner of normal, non-hazardous, waste. In this regard, many gas tanks are made of steel which is highly recyclable.

In order to make it even easier to ascertain that thusly evacuated gas tanks could no longer house hazardous gases, a label, or marker, 98 is attached thereto by an expandable spring 100 which is shoved into a mouth 102 of the evacuated gas tank 82 (see FIG. 7). The expandable spring 100 has feet 104 which engage bottom ends of a mouth tube 106 of the gas tank 82 to retain the label 98, having indicia thereon, at the mouth 102. Not only does the indicia inform waste handlers that the gas tank 82 is fully evacuated, but the manner in which the label 98 is attached to the gas tank 82, with the spring 100 extending into the mouth 102 thereof, visually proves it to him. The label 98 is easily removable from the gas tank 82 by squeezing legs of the expandable spring 100.

It will be readily appreciated by those of ordinary skill in the art that the valve-removal-rod lever provides a user with a mechanical advantage which makes it relatively easy for a user to operate the gas tank evacuator of this invention. Similarly, the cylinder bushing 54 which transmits longitudinal movement to the valve-removal rod, while allowing the valve-removal rod to rotate, allows a lever to be used in the manner described.

Also, the slidable valve-actuator pin 18 is quite helpful in that it allows a user to check tank pressure prior to finally evacuating the tank.

In the preferred embodiment, both the evacuator housing 12 and the valve-removal-rod lever 16 are constructed of aluminum. The valve-removal rod 14 is machined as a single piece from stainless steel. The bushing 34 is brass as is the cylinder bushing 54. The links 60 are of stainless steel. The valve-actuator pin 18 is constructed of stainless steel.

While the invention has been particularly shown and described with reference to a preferred embodiment, it will be understood by those of ordinary skill in the art that various changes in form and detail may be made therein without departing from the spirit and scope of the invention.

For example, FIG. 8 depicts an embellished valve-removal rod 14' and valve actuator pin 18'. These members differ from the valve-removal rod 14 and the valve actuator pin 18 depicted in the other drawings in that the valve actuator pin 18', and a button 108 fixedly attached thereto are biased upwardly by a compression spring 110. Thus, when one has pivoted the lever handle 72 downwardly and wishes to actuate the valve 88, he depresses the button 108 to move the valve actuator pin 18' downwardly. Once the user has determined that enough gas has been released from the gas tank 82 in this manner, he releases the button 108 and the compression spring 110 drives the button 108 and the valve actuator pin 18' upwardly.

Also, with regard to other possible embodiments, FIG. 9 depicts a modified expandable spring 100'. Rather than having two legs, as does the expandable spring 100 in FIG. 7, the expandable spring 100' of FIG. 9 has one leg with one foot 104' and a ring label 98'. The ring label 98' not only informs others of the condition of the gas tank, but also prevents the expandable spring 100' from falling through the mouth 102 of the gas tank 82. The single foot 104'; once it has passed through the mouth 102 of the gas tank 82, engages the mouth tube 106 to prevent the expandable spring 100' from being removed from the gas tank 82.

The embodiments of the invention in which an exclusive property or privilege are claimed are defined as follows:

1. A gas tank evacuator for evacuating a gas tank of a type having a stem-actuated valve assembly at an attachment neck thereof, said gas tank evacuator comprising:

an evacuator housing including an attachment means for attaching said housing to an attachment neck of a gas tank;

an elongated valve-removal rod for passing through said evacuator housing at said attachment means and being slidably mounted in said evacuator housing with freedom of longitudinal movement therein, said valve-removal rod having a valve-engaging means at a lower end thereof for engaging a stem-actuated valve assembly of a gas tank;

an elongated valve-actuator pin passing through said valve-removal rod and being longer than said valve-removal rod so as to extend from the lower end and an opposite upper end of said valve-removal rod, said valve-actuator pin being is slidably mounted in said valve-removal rod with freedom of longitudinal movement therein;

wherein said attachment neck of said gas tank can be attached to said housing by said attachment means with said valve-removal rod pulled longitudinally away from a valve in said attachment neck while said valve-actuator pin is moved longitudinally through valve-removal rod for depressing a stem of said stem-actuated valve assembly to thereby release gas from said gas tank without sufficient engagement of said valve-engaging means of said valve-removal rod with the stem-actuated valve assembly for removing said stem-actuated valve assembly.

2. A gas tank evacuator as in claim 1 wherein is further included a valve-removal-rod lever pivotally attached to said evacuator housing and said valve-removal rod for driving said valve-removal rod longitudinally.

3. A gas tank evacuator as in claim 2 wherein said valve-removal-rod lever and said evacuator housing include long, thin, handles which, in one orientation of said valve-removal-rod lever, are substantially parallel.

4. A gas tank evacuator as in claim 3 wherein said valve-removal rod has freedom of rotation relative to said valve-removal-rod lever.

5. A gas tank evacuator as in claim 4 wherein said valve-engaging means comprises at least a barb and elements defining a downwardly-directed groove.

6. A gas tank evacuator as in claim 2 wherein said valve-removal rod has freedom of rotation relative to said valve-removal-rod lever.

7. A gas tank evacuator as in claim 1 wherein said evacuator housing defines a gas release passage.

8. A gas tank evacuator as in claim 7 wherein said evacuator housing includes a means for selectively attaching a filter to said housing at said gas-release passage for channeling gas evacuated from said gas tank through said filter.

9. A gas tank evacuator as in claim 8 wherein said evacuator housing includes a pressure gauge therein for measuring a pressure of gas in said gas tank.

10. A gas tank evacuator as in claim 1 wherein said evacuator housing includes a pressure gauge therein for measuring a pressure of gas in said gas tank.

11. A gas tank evacuator for evacuating a gas tank of a type having a stem-actuated valve assembly at an attachment neck of the gas tank, said gas tank evacuator comprising:
  an evacuator housing including an attachment means for attaching said housing to an attachment neck of a gas tank;
  an elongated valve-removal rod for passing through said evacuator housing at said attachment means and being slidably mounted in said evacuator housing with freedom of longitudinal movement therein, said valve-removal rod having a valve-engaging means at a lower end thereof for engaging a stem-actuated valve assembly of a gas tank;
  a valve-removal-rod lever pivotally attached to said evacuator housing and to said valve-removing rod for driving said valve-removing rod longitudinally through said housing at said attachment means for causing said valve-engaging means to removably engage said stem-actuated valve assembly of said gas tank and for pulling elements of said stem-actuated gas valve of said gas tank from said gas tank.

12. A gas tank evacuator as in claim 11 wherein is further included a pivot link which is pivotally attached to said valve-removal rod at one end thereof and to a bushing at an opposite end thereof and wherein said bushing is coupled to said elongated valve-removal rod for allowing rotational movement of said elongated valve-removal rod but not allowing longitudinal movement of said valve-removal rod relative to said bushing.

13. A gas tank evacuator as in claim 11 wherein said valve-removal-rod lever and said evacuator housing include long, thin, handles which, in one orientation of said valve-removal-rod lever, are substantially parallel.

14. A gas tank evacuator as in claim 11 wherein said valve-engaging means comprises at least a barb and elements defining a downwardly-directed groove.

15. A gas tank evacuator as in claim 11 wherein said evacuator housing defines a gas release passage.

16. A gas tank evacuator as in claim 11 wherein said evacuator housing includes a means for selectively attaching a filter to said housing at said gas-release passage for channeling gas evacuated from said gas tank through said filter.

17. A gas tank evacuator as in claim 16 wherein said evacuator housing includes a pressure gauge therein for measuring a pressure of gas in said gas tank.

18. A gas tank evacuator as in claim 11 wherein said evacuator housing includes a pressure gauge therein for measuring a pressure of gas in said gas tank.

19. A gas tank evacuator for evacuating gas tanks of a type having a stem-actuated valve assembly at an attachment neck thereof, said gas tank evacuator comprising:
  an evacuator housing including an attachment means for attaching said housing to an attachment neck of a gas tank;
  an elongated valve-removal rod for passing through said evacuator housing at said attachment means and being slidably mounted in said evacuator housing with freedom of longitudinal movement therein, said valve-removal rod having a valve-engaging means at a lower end thereof for engaging a stem-actuated valve assembly of a gas tank;
  means for removably attaching a filter canister to said evacuator housing, wherein said evacuator housing defines a gas-release passage for channeling gas evacuated from said gas tank through said removable filter canister.

* * * * *